United States Patent
Spengler

(10) Patent No.: US 6,749,794 B2
(45) Date of Patent: Jun. 15, 2004

(54) METHOD AND APPARATUS FOR MOLDING COMPONENTS WITH MOLDED-IN SURFACE TEXTURE

(75) Inventor: Ernst Maximilian Spengler, Heusenstamm (DE)

(73) Assignee: R + S Technik GmbH, Offenbach am Main (DE)

(*) Notice: Subject to any disclaimer, the term of this patent is extended or adjusted under 35 U.S.C. 154(b) by 325 days.

(21) Appl. No.: 09/929,693

(22) Filed: Aug. 13, 2001

(65) Prior Publication Data

US 2003/0030188 A1 Feb. 13, 2003

(51) Int. Cl.[7] .......................... B29C 44/06; B29C 49/22
(52) U.S. Cl. ................ 264/458; 264/46.4; 264/101; 264/293; 264/321; 264/327; 264/510; 264/520; 264/553; 264/554
(58) Field of Search .................. 264/101, 327, 264/510, 520, 554, 321, 458, 46.4, 293, 553; 156/79

(56) References Cited

U.S. PATENT DOCUMENTS

| | | | |
|---|---|---|---|
| 3,676,537 A | * 7/1972 | Winstead | 264/48 |
| 4,148,956 A | 4/1979 | Breitenfellner et al. | |
| 4,167,595 A | 9/1979 | Peters et al. | |
| 4,418,106 A | 11/1983 | Landler et al. | |
| 4,478,660 A | 10/1984 | Landler et al. | |
| 4,555,380 A | 11/1985 | Munakata et al. | |
| 4,576,860 A | 3/1986 | Fink et al. | |
| 4,740,417 A | * 4/1988 | Tornero | 428/308.4 |
| 4,751,141 A | 6/1988 | Fink et al. | |
| 4,767,667 A | 8/1988 | Schneider et al. | |
| 4,892,605 A | 1/1990 | Schneider et al. | |
| 5,482,766 A | 1/1996 | Mathavan et al. | |
| 5,611,982 A | 3/1997 | Mathavan et al. | |
| 5,702,810 A | 12/1997 | Koseki et al. | |
| 5,811,046 A | 9/1998 | Dous et al. | |
| 5,858,404 A | 1/1999 | Dous et al. | |
| 5,863,064 A | * 1/1999 | Rheinlander et al. | 280/732 |
| 5,976,288 A | * 11/1999 | Ekendahl | 156/78 |
| 5,976,289 A | 11/1999 | Kawakubo et al. | |
| 6,136,415 A | 10/2000 | Spengler | |
| 6,333,094 B1 | 12/2001 | Schneider et al. | |

FOREIGN PATENT DOCUMENTS

| | | |
|---|---|---|
| DE | 8706204 | 10/1988 |
| DE | 3714365 | 11/1988 |
| DE | 3714366 | 11/1988 |
| DE | 3714367 | 11/1988 |
| DE | 8709582 | 12/1988 |
| DE | 3723021 | 1/1989 |
| DE | 3834607 | 4/1990 |
| DE | 3834608 | 4/1990 |
| DE | 3834620 | 4/1990 |
| DE | 3834648 | 4/1990 |
| DE | 4007876 | 9/1991 |
| DE | 4007877 | 9/1991 |
| DE | 4030477 | 4/1992 |
| EP | 0450482 | 10/1991 |
| EP | 0951984 | 10/1999 |
| WO | WO01/4199901 | 6/2001 |

* cited by examiner

*Primary Examiner*—Allan R. Kuhns
(74) *Attorney, Agent, or Firm*—W. F. Fasse; W. G. Fasse

(57) ABSTRACT

An automobile interior trim component includes a molded substrate laminated onto a cover sheet including a foam backing and a skin film having a surface texture. The cover sheet is preheated so the skin film is in a melted viscous liquid state above its melting temperature, and the foam backing remains in a solid elastic foam state below its melting temperature. The preheated cover sheet is mechanically pre-molded by a back mold into a front mold. Pressurized air is applied through the back mold, to blow-mold the cover sheet against the front mold, so the melted skin film reproduces a surface texture of the front mold surface while the solid foam backing acts as a buffer and air barrier layer. Vacuum is applied through the front mold surface. The mold is opened, a substrate is introduced, and the back mold then molds and thermally laminates the substrate against the foam backing of the cover sheet.

33 Claims, 5 Drawing Sheets

METHOD AND APPARATUS FOR MOLDING COMPONENTS WITH MOLDED-IN SURFACE TEXTURE

FIELD OF THE INVENTION

The invention relates to a method of manufacturing molded parts, such as automobile interior trim components, that have a molded-in surface texture, as well as an apparatus for carrying out such a method.

BACKGROUND INFORMATION

In various technical fields, and particularly in the automobile manufacturing industry, there is a constantly growing demand for various molded parts that have a surface texture molded into or onto the surfaces of such parts. For example, it is increasingly desired to provide interior trim components of a motor vehicle, such as headliners, door trim insert panels, column trim covers, consoles, parcel shelves, dashboards, and the like, with a surface texture such as an artificial leather grain, an artificial wood-like grain, a pattern of dots or lines or the like, simulated stitching lines, raised bumps and indented depressions or even molded-in text or logos. Such surface textures enhance the appearance of the visible surface of the molded part, or enhance the surface feel or grip characteristic provided by the surface, or provide intended information in the way of text or logos or the like.

In any event, however, the molded-in texture must be accurately and consistently represented or reproduced on the surface of the molded part, in order to achieve the intended effects. On the other hand, if the intended surface texture is inaccurately or distortedly reproduced on the surface of the molded part, this results in a visually unacceptable part which must be scrapped. Thus, it has been a significant problem in the industry, that defective or unacceptable surface texturing leads to a rather high reject and discard rate of such parts, although the parts may otherwise be fully in conformance with other requirements.

If has also been extremely difficult or impossible up to the present time, to achieve complex, or finely detailed surface textures, without distortion or misrepresentation, using conventionally known methods. One conventional method involves providing a flat starting sheet of cover stock that is pre-textured with the desired surface texture. Then, this pre-textured cover stock or cover sheet is deep-drawn and molded while being laminated with a backing substrate or the like. During this molding operation, which forms three-dimensional contours of the finished molded part, the pattern or surface texture of the cover sheet is necessarily distorted at different areas, depending on the degree of stretching and three-dimensional molding that has taken place at these respective areas. Namely, an area that is more deeply or extensively drawn and stretched will suffer an area expansion of the intended surface texture. Thus, a regular geometric pattern of dots or lines or the like on the starting cover sheet material will clearly show the areas of distortion resulting from the three-dimensional molding, and will generally not be acceptable. Text or the like can also not be provided at molded areas. Such a technique is generally only suitable for random textures of which a distortion is not readily apparent, or for providing a texture on areas that are not strongly contoured. Another problem of such a conventional process arises when the textured surface of the cover sheet is pressed in contact with a flat surface of a mold. In such a case, the surface texture will be at least partially crushed or flattened or "ironed out", so that any resulting surface texture cannot have a very strong or roughly profiled texture.

To avoid the above-mentioned distortion that arises when deep-drawing or molding a pre-textured cover sheet, techniques have been developed to apply a surface texture onto a cover sheet or a surface of a molded part after the molding rather than before the molding operation. Such techniques are complicated, time consuming and not economical in production.

Two further conventional processes for forming a contoured skin sheet with a surface texture are the powder and spray slush methods. In the powder slush method, a thin galvanically fabricated zinc sheet is used as a contoured and textured mold which is heated and dipped into or coated with a polymer powder such as a polyvinyl chloride (PVC) powder, which then melts and forms a corresponding contoured and textured PVC skin on the zinc mold. The skin is peeled off, and can thereafter be applied onto a molded substrate. Alternatively, in the spray slush method, a liquid polymer such as polyurethane is sprayed onto the textured mold to form a textured skin, which can thereafter be peeled off and applied on a molded substrate. These slush skin methods are rather complicated, time consuming, and costly due to several additional required steps. Moreover, these processes generally use polyvinyl chloride and polyurethane materials, which are becoming ever more undesirable because they are not easily recycled, and they represent toxic risks and disposal problems. Also, the thin mold sheets have a relatively short useful life cycle, which leads to high tooling costs, and the surface textures that can be achieved are limited. Also, the conventional patterning or texturing processes all involve additional steps end additional work effort, beyond the molding operation itself.

SUMMARY OF THE INVENTION

In view of the above, it is an object of the invention to provide a method and an apparatus for producing a molded part having a surface texture that accurately represents the intended surface texture without distortion, and that is not limited as to the type of surface texture, but instead can be used to form synthetic leather grains, synthetic wood grains, patterns of dots and stripes or the like, raised bumps, indented depressions, synthetic stitching lines, text, logos, and the like with great detail, accuracy, and reproducibility. It is a further object of the invention to be able to mold the intended surface texture into the surface of the molded part during its molding fabrication, without requiring additional work steps or effort to achieve this surface texture. Another object of the invention is to use materials that are easily recyclable for the textured cover sheet, in combination with essentially any possible backing or substrate material. The invention further aims to avoid or overcome the disadvantages of the prior art, and to achieve additional advantages, as apparent from the present specification.

The above objects have been achieved according to the invention in a three-dimensionally contoured molded part including a substrate and a cover sheet laminated thereon, wherein the cover sheet includes a skin film and a foam backing that is adhered or bonded onto the substrate. The skin film is provided with a surface texture that is uniformly and consistently applied without distortion over three-dimensionally contoured areas of the molded part. Such a molded part may be produced, and the above objects have further been achieved according to the invention, in a method of molding a three-dimensionally contoured molded part having a surface texture.

The inventive method involves the following steps. A cover sheet is provided, which includes a surface skin film and a foam backing. The cover sheet is heated in such a manner so that the skin film is heated to at least its melting temperature while the foam backing is heated only to a temperature below its melting temperature. Thereby, particularly, the skin film material is entirely melted to a viscous liquid state, while the foam backing remains an elastic foam solid, whereby the foam backing acts as a solid carrier for holding and carrying the viscous liquid film. To some extent, the viscous liquid skin film material also penetrates into or partially saturates the open pores at the interface surface of the foam backing, somewhat like a liquid being absorbed into a sponge. However, since the foam backing is a closed-cell foam that is not permeable through its thickness, the extent of absorption of the viscous liquid skin film material into the foam backing is limited to the interface surface. Preferably the cover sheet is a foam-backed thermoplastic polyolefin (TPO) sheet material. Suitable thermoplastics for the skin film include polypropylene, polyethylene, polyvinyl chloride (PVC), and acrylonitrile butadiene styrene (ABS) polymers, for example.

The pre-heated cover sheet is arranged between a first or front mold and a second or back mold. The mold surface of the front mold has been provided with an exact negative image of the desired resulting surface texture of the finished molded part. Namely, this surface texture has been provided on the mold surface by mechanical engraving, embossing, chemical etching, or the like, after the surface of the mold has been milled and highly polished. After the pre-heated cover sheet has been arranged between the molds, the front mold and the back mold are closed relative to each other, while the back mold preferably mechanically pre-molds the cover sheet toward the front mold. An air-tight seal is provided between the front and back molds. A pressurized pressure medium is introduced into a gap between the back mold and the foam backing of the cover sheet, whereby the pressure medium further blow-molds the cover sheet toward and against the front mold. Air is vented out from between the skin film of the cover sheet and the textured surface of the front mold, and a low vacuum is applied between the skin film and the textured surface of the front mold.

In this manner, the pressurized pressure medium presses the cover sheet so that the skin film (in the melted viscous liquid state) is pressed uniformly and evenly into contact with the textured mold surface of the front mold, so as to mold the inverse texture into the skin film. Meanwhile, the low vacuum ensures that all air pockets between the skin film and the textured mold surface are removed, and that the skin film is held in fixed registration on the textured mold surface to avoid distortion or double imprinting of the texture image. Since the foam backing of the cover sheet is closed-cell foam that is non-permeable and that remains in an elastic solid (non-melted) state, there is no danger of a blow-through of the pressure medium, but instead, the foam backing acts as a molding buffer or intermediary layer to uniformly apply the molding pressure to the skin film to press it uniformly against the contoured and textured surface of the front mold.

Since the skin film is in a melted viscous liquid state as mentioned above, the skin film material is molded against the textured surface of the front mold, so as to accurately reproduce the opposite or inverse of the texture of the mold surface into the skin film surface. By then cooling against the front mold, the skin film re-solidifies with this surface texture fixed therein. Since the cover sheet is essentially simultaneously contoured and imprinted with the surface texture, there is no risk of the surface texture being distorted due to the contouring or molding of the cover sheet. Instead, any surface texture that can be engraved or etched or otherwise formed on the contoured mold surface can be accurately reproduced on the skin sheet.

In a subsequent step, the mold is opened, and the finished textured skin may be removed for further separate use, or a substrate can be formed or laminated onto the back surface of the foam backing of the cover sheet directly in the same molding apparatus. In a preferred embodiment, a pre-heated sheet of a substrate material (such as a composite of natural fibers, glass fibers or polyester fibers with thermoplastic fibers such as polypropylene fibers) is molded by the back mold against the back surface of the foam backing. According to further alternatives, a foaming polymer resin material may be injected, sprayed, poured or cast against the back surface of the foam backing, and then molded against the foam backing by the back mold. For example, in this regard, the substrate material could be a foaming polyurethane material. Preferably, the front mold and the back mold are so dimensioned and configured relative to each other, to accommodate the cover sheet therebetween, as well as a gap in the range of 2 to 5 mm, which acts as a pressure medium receiving gap during the initial molding of the cover sheet as mentioned above, and which will receive and form the substrate therein during the subsequent substrate laminating step.

Preferably, the pressure medium is compressed air which is provided at a gage pressure in the range from 1 to 30 bar and especially in the range from 5 or 6 to 20 bar. On the other hand, the low vacuum applied from the side of the front mold is substantially less than 1 bar below atmospheric pressure, and especially less than 0.5 bar below atmospheric pressure, or even less than 0.3 bar (e.g. 0.05 to 0.3 bar) below atmospheric pressure, and especially about 0.1 bar below atmospheric pressure.

The vacuum is applied through very fine vacuum holes, such as laser bored holes having a diameter of less than 0.5 mm, especially less than 0.3 mm, and particularly about 0.2 mm, through the mold surface of the front mold. The very fine diameter of these vacuum holes, in combination with the very low vacuum being applied, and the buffering effect of the solid foam backing, ensures that the melted skin film material will not be sucked into these vacuum holes, and the finished surface of the skin film on the molded part will not show any nubs or pips of skin material at the locations of the vacuum holes. Instead, the finished textured surface of the molded part will be an exact reproduction of the surface texture provided on the front mold surface, without any distortion and without any vacuum hole marks.

Moreover, as is evident from the above discussion, the objects of the invention have further been achieved using a molding apparatus including a first front mold and a second back mold. The front mold has a mold surface that has been milled to the required contour and then highly polished, and thereafter provided with a surface texture by mechanical engraving, milling, etching, or the like. The front mold includes a vacuum plenum connected to a source of vacuum, and vacuum holes extending from the vacuum plenum through the front mold surface. These vacuum holes particularly include a mechanically bored hole portion, and a laser bored hole portion extending from the mechanically bored hole portion through the front mold surface. The laser bored hole portions have diameters as described above. Both the front mold and the back mold are tempered by flowing cooling water or cooling oil or the like through coolant passages, for example to maintain the molds at a temperature of 50 to 60° C.

The back mold substantially mates with the front mold, with a suitable mold gap therebetween, and is movable relative to the front mold. Namely, either one of the molds is movable relative to the other, or both molds are movable relative to each other. The back mold includes pressure medium distribution passages and pressure medium holes, connected to a source of pressure medium, such as pressurized air with a pressure in the range from 1 to 30 bar. The pressure medium holes are provided on all surfaces of the mold surface of the back mold, to ensure a uniform distribution of the pressure medium. A perimeter seal frame provides a seal between the front mold and the back mold around the perimeter thereof. The seal frame is preferably mounted to the back mold with a yielding connection, such as by a spring-loaded slide arrangement. The seal frame can also function as a mechanical stop that limits the closing travel of the molds so as to reliably maintain the intended gap therebetween as mentioned above.

Either the front mold or the back mold may be configured as a female mold, while the respective opposite mold is a mating male mold. Similarly, either the front mold or the back mold may be considered as the negative mold or the positive mold, and either of these molds may be the top mold or the bottom mold. Preferably, the front mold is the top mold, while the back mold is the bottom mold. This mold arrangement corresponds to the cover sheet being oriented with the foam backing on the bottom, carrying the melted skin film material on top of it. This is necessary especially for larger molded parts, because flipping this arrangement "upside down" would allow the melted skin film material to flow or drip down from the foam backing that acts as a carrier. The "upside down" arrangement can, however, be used successfully for smaller sized parts to be molded.

The inventive apparatus and method further include a heater arrangement, preferably with an infrared heater on top for heating the upper skin film material (e.g. to about 200° C.) by infrared radiation heating, and a liquid-cooled metal tempering plate on the bottom to support and keep the foam backing material at a lower temperature (e.g. about 140° C.), in a preferred embodiment. The term "about" with reference to temperatures herein means ±5° C., unless otherwise defined. The cover sheet is carried by a tensioning frame, clamp frame, tentering frame or the like. This frame carries the cover sheet into the heater arrangement, then from there into the forming mold arrangement.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
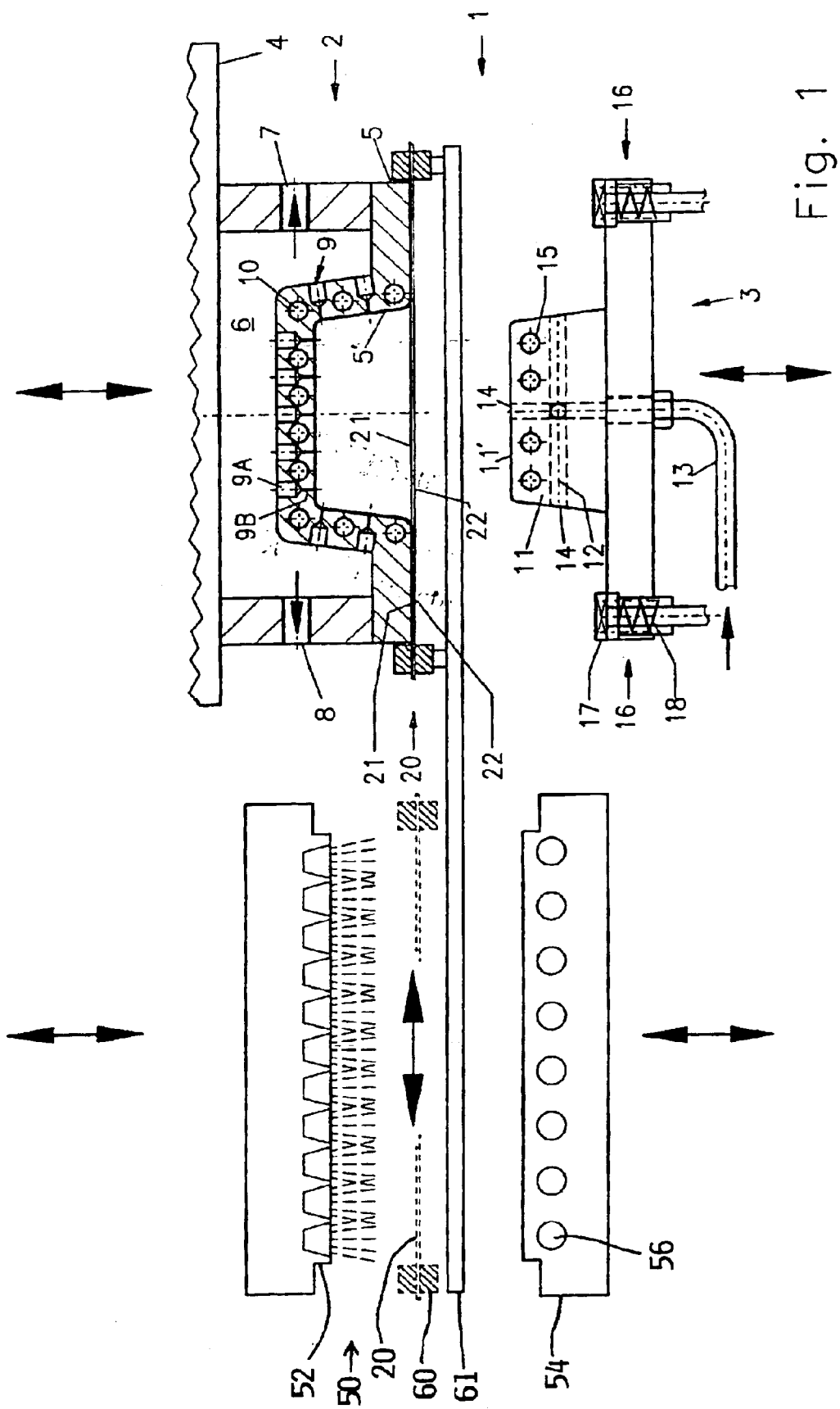
FIG. 1 is a schematic sectional view of a heater arrangement and a molding apparatus for carrying out a molding method to produce a molded part, according to the invention.

FIG. 1 schematically shows a forming line according to the invention, including a heater arrangement 50 and a molding apparatus 1, as well as a cover sheet transfer carriage primarily including a clamp frame 60. The clamp frame 60 holds and carries a cover sheet 20 including a skin film 21 on a foam backing 22. The clamp frame 60 moves along transport rails 61 to thereby transport the cover sheet 20 into the heater arrangement 50, holds the cover sheet 20 while it is heated there, and then further moves along the rails 61 to transport the heated cover sheet into position in the molding apparatus 1.

The heater arrangement 50 in this embodiment preferably includes an infrared heater array 52 arranged above the plane of the clamp frame 60, and a tempering contact plate 54 arranged below the plane of the clamp frame 60. The tempering contact plate 54 is, for example, a metal plate 54 that is cooled by a cooling liquid flowing through coolant passages 56 therein. The heater array 52 and the tempering contact plate 54 are each vertically movable toward and away from the plane of the clamp frame 60, as shown by respective double-headed arrows, by any conventional means such as hydraulic or pneumatic cylinders (not shown).

The molding apparatus 1 including a front mold tool 2 and a back mold tool 3. In the present embodiment, the front mold tool 2 is an upper female mold that is supported on a head plate or cross beam 4, while the back mold tool 3 is an lower male mold. Either one or both of the mold tools 2 and 3 is/are movable vertically relative to each other, as indicated schematically by double-headed arrows. The relative motion between the molds can be achieved by any conventionally known mechanisms, including hydraulic cylinders, pneumatic cylinders, mechanical drives such as spindle drives, and the like. As alternatives, either the front mold tool 2 or the back mold tool 3 may be the top or bottom mold, and may be a male mold or a female mold. Generally, it is preferred that the front mold tool 2 is the upper mold tool.

The front mold tool 2 includes a front mold 5 with a front mold surface 5' that has been milled, polished, and provided with a surface texture by engraving or etching or the like, as described above. This surface texture is provided at one or more selected areas or the entirety of the front mold surface 5'. The front mold 5 is preferably a massive steel mold, which can be readily fabricated, milled, polished and engraved or etched by known mold-making and metal-working techniques. Such a steel mold provides great self-strength, a long useful operating life, and allows a great range of different surface textures to be provided on the front mold surface 5'. Alternatively, the front mold 5 can be a galvanically fabricated zinc mold surface, which may be produced more quickly and cheaply (e.g. for molding runs with a smaller number of parts to be molded), but has a shorter useful operating life. Such a galvanically produced zinc mold can be perforated or made porous for applying vacuum suction there-through by a chemical etching or milling process.

The front mold tool 2 encloses a vacuum plenum or chamber 6, with at least one vacuum port 7 that is connected to a suitable source of vacuum (not shown), which is adapted to provide a slight vacuum, especially at about 0.1 bar below atmospheric pressure. The vacuum port 7 may also serve as a passive exhaust air venting port or the front mold tool 2 may additionally include an exhaust air venting port 8.

A plurality of vacuum application holes or simply vacuum holes 9 extend through the front mold 5 to communicate from the vacuum plenum 6 through the front mold surface 5'. Each one of these vacuum holes 9 in a massive steel front mold 5 includes a mechanically bored hole portion 9A and a laser bored hole portion 9B. The mechanically bored hole portion 9A may have any suitable diameter, e.g. 3 to 5 mm, while the laser bored hole portion 9B has a very fine diameter, e.g. less than 0.5 mm, or especially less than 0.3 mm, and particularly about 0.2 mm. Note that the dimensions of the vacuum holes 9 shown in the schematic figures are significantly exaggerated for the sake of explanatory illustration. Such a combined structure of the vacuum holes 9 efficiently combines the advantages of rapid and economical mechanical boring, with the advantages of a fine diameter hole achieved by laser boring. The diameter of the laser bored hole portions 9B is selected to prevent the molten skin film material from flowing or being sucked into these vacuum holes 9, so as to avoid the formation of undesired nubs, pips, or other defects on the finished surface of the molded part. Alternatively, in a galvanically produced zinc front mold 5, the required vacuum holes 9 can be chemically milled or etched through the mold with the required fine diameter. The plural vacuum holes 9 are distributed and arranged in a pattern, e.g. respectively spaced 30 to 40 mm apart from each other, across the entire relevant front mold surface 5' to which a vacuum is to be applied, to ensure a uniform application of vacuum and venting and removal of any trapped exhaust air.

The front mold tool 2 further includes coolant passages 10 through which a tempering liquid such as water or oil may flow, in order to temper the front mold 5 to a constant and uniform temperature that is suitable for cooling and solidifying the molded part at an appropriate rate, e.g. a mold temperature in the range of 45 to 60° C., and particularly about 50° C.

The back mold tool 3 includes a back mold 11 with a back mold surface 11', that is configured generally to mate with the front mold 5, while providing a suitable gap (e.g. about 4 mm) there-between as will be discussed below. The back mold tool 3 has an air plenum or air passages 12 therein, connecting to an air line 13 and ending at air holes 14 in the several respective surfaces or portions of the back mold surface 11'. The air line 13 is adapted to be connected to a source of compressed air, or other pressure medium such as steam, some other gas, or a liquid, at a pressure from 1 to 30 bar, more particularly 6 to 30 bar, and especially 5 to 20 bar. The air holes 14 may be mechanically bored holes with any suitable diameter, and are distributed over the back mold surface 11' to ensure a uniform distribution of the pressurized air or other pressure medium in the molding process.

Alternatively, the air holes 14 may be formed to include mechanically bored hole portions and laser bored hole portions like the vacuum holes 9 in the front mold 5. Such an embodiment will allow either a pressure medium or a vacuum to be applied to the air line 13 and then through the air holes 14. The molding apparatus can be operated in a first molding stage with vacuum applied through the front mold 5 and pressure applied through the back mold 11, and then in a subsequent molding stage with pressure applied through the front mold 5 and vacuum applied through the back mold 11, so as to mold and laminate together two opposite cover sheets on opposite sides of a substrate, whereby the skin films of the cover sheets on both opposite sides of the molded part will be provided with a surface texture according to the invention. In such an embodiment, the back mold surface 11' is also provided with a surface texture, similarly to the front mold surface 5'.

Just like the front mold 5, the back mold 11 is provided with coolant passages 15 through which a tempering liquid may be circulated, to maintain the back mold 11 at a uniform and constant temperature, for example in the range of 45 to 60° C.

The molding apparatus 1 further includes a perimeter seal frame 16, that is adapted to achieve an air-tight high pressure seal between the back mold 11 and the front mold 5, around the perimeter thereof, in order to contain the pressurized pressure medium in the mold gap as will be described below. This seal is established and maintained during the molding of the cover sheet 20 and also in a later step of back-molding and laminating a substrate material 30 onto the cover sheet as will be discussed below. Particularly, the perimeter seal frame 16 is preferably elastically yieldably mounted to the back mold tool 3 so as to move therewith toward the front mold tool 2, until a seal member 17 presses and seals against the cover sheet (as will be discussed below). Then, an elastic yielding device 18 such as a spring or a pneumatic cylinder or the like yields at a rated force to tightly hold the seal 17 against the front mold 5, with the cover sheet therebetween. The seal frame 16 can be designed to incorporate or cooperate with the clamp frame 60 to achieve the required air-tight seal.

An example molding process according to the invention will now be described with reference to the drawings. FIG. 1 shows an initial stage of the operation of the molding apparatus 1. A cover sheet 20 including a skin film 21 and a foam backing 22 has been heated in the heater arrangement 50 (as shown by dashed lines), and then transported by the clamp frame 60 along a flat horizontal plane, i.e. along the rails 61, to be positioned between the front mold 5 and the back mold 11.

More particularly referring to FIG. 1, the cover sheet 20 is carried and held around its perimeter edges by the clamping slip frame 60 (or any other conventionally known means, or the heated cover sheet 20 may simply be laid onto the back mold 11). The skin film 21 is a thermoplastic film, and the foam backing 22 is a closed-cell or substantially closed-cell polymeric foam that is preferably not air permeable through its thickness. Preferably, the cover sheet 20 is a conventionally known foam-backed thermoplastic polyolefin (TPO) sheet. Particularly, the skin-film 21 is preferably a polypropylene film or a polyethylene film, but could alternatively be a polyvinylchloride film. The foam backing 22 may be the same polymeric material as the skin film 21 (e.g. polypropylene) but in a foamed condition, or may be a different polymeric material (e.g. polyurethane), preferably having a higher melting temperature than that of the skin film 21 (or no actual melting temperature due to its crosslinking). A preferred general combination is a meltable thermoplastic skin film 21 on a non-melting thermoset or higher-temperature-melting thermoplastic foam backing 22.

In the stage shown in FIG. 1, the cover sheet 20 has been pre-heated by any known heating means, for example the illustrated infrared radiant heater array 52, so as to heat the skin film 21 (e.g. to about 200° C.), while the foam backing 22 contacts the tempering plate 54 so as to keep the foam backing relatively cool (e.g. below about 160° C., or especially about 140° C.) so that it does not melt. In any event; the cover sheet 20 has been heated so as to heat the skin film 21 to at least its melting temperature (and with enough residual heat so that it will remain melted until it is molded in the next step), while allowing the foam backing 22 to reach a temperature at which it is moldable, but below its melting temperature. The skin film 21 has been substantially or entirely melted into a melted viscous liquid state, but remains uniformly adhered onto and carried by the foam backing 22, which remains in a solid elastic foam state, i.e. is not melted into a condition in which it is unable to maintain tension and support for the melted material of the skin film 21. In view of the melted, viscous liquid condition of the skin film 21, the cover sheet 20 is preferably oriented as illustrated, with the skin film 21 on top and the foam backing 22 on the bottom so that the melted skin film cannot drip or run off of the foam backing.

Figure 2:
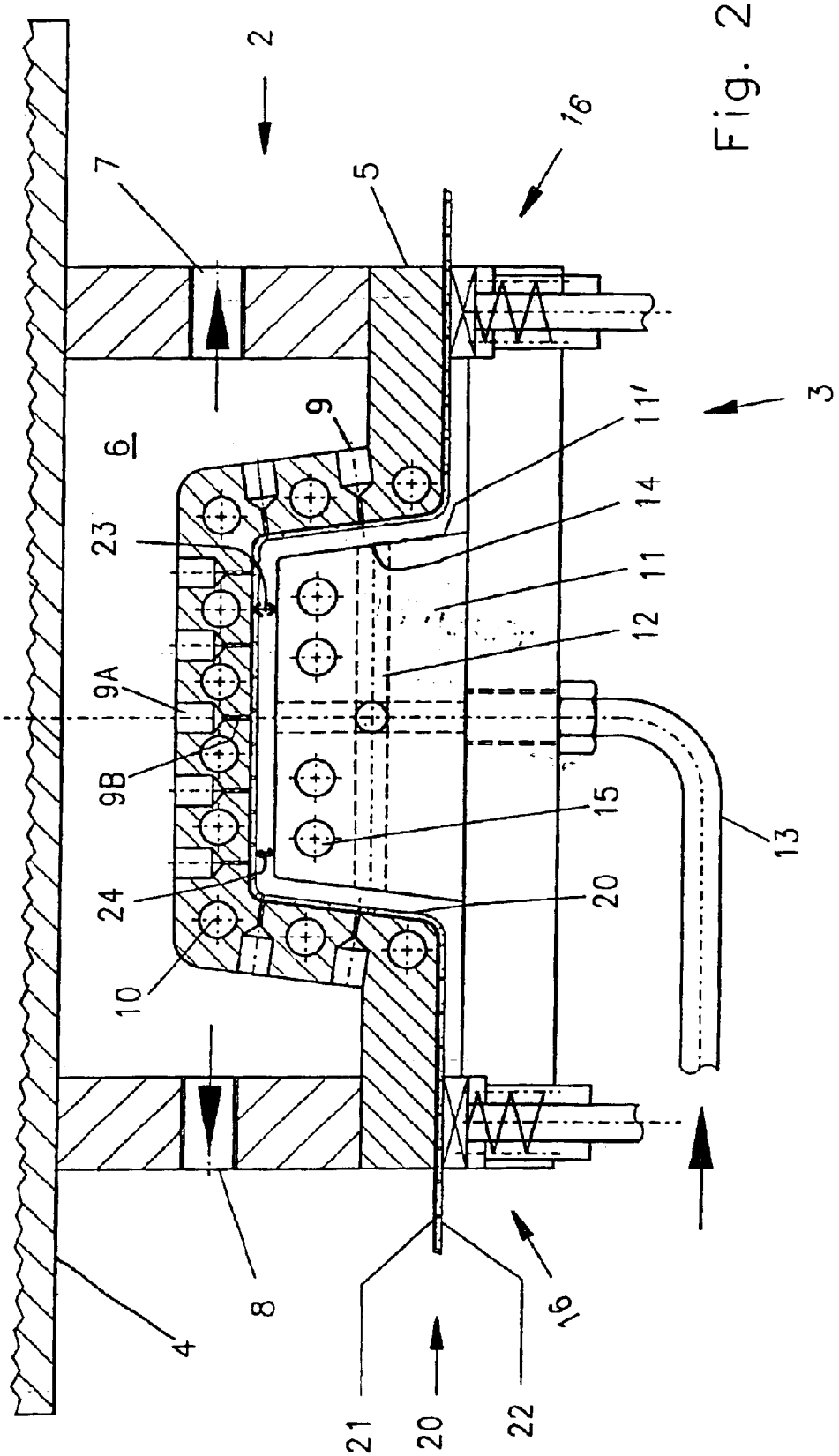
FIG. 2 is a schematic sectional view of the molding apparatus of FIG. 1, after the mold has been closed, while applying pressurized air through the back mold and a vacuum through the front mold, to a cover sheet being molded therebetween.

Once the pre-heated cover sheet 20 has been positioned between the front mold 5 and the back mold 11 as shown in FIG. 1, the back mold tool 3 is driven upward and/or the front mold tool 2 is driven downward, so that the back mold 11 or particularly the back mold surface 11' pushes the cover sheet 20 upward relative to the front mold surface 5', and thereby mechanically pre-molds the cover sheet 20 into a molded contour generally against the front mold surface 5' of the front mold 5, substantially as shown in FIG. 2. Note that the back mold 11 contacts and presses against the slightly cooler, non-melted foam backing 22, while the melted skin film 21 is pressed against the textured front mold surface 5'. Also, the perimeter seal frame 16 has formed an air-tight seal around the perimeter of the cover sheet 20 pressing against the front mold 5. During this pre-molding process, air is passively allowed to escape from the space between the cover sheet 20 and the front mold surface 5', through the vacuum holes 9, and out through the vacuum port 7 or the exhaust air venting port 8. It is not necessary, but optionally possible, to apply a vacuum through the vacuum port 7 at this stage. It is preferred not to apply a vacuum at this stage, to reduce the total vacuum demand, in view of the rather large volume of air that is passively vented during this stage.

As shown in FIG. 2, the back mold tool 3 has moved upwardly to its final end position relative to the front mold tool 2, with a defined mold gap 23 between the front mold surface 5' and the back mold surface 11'. This mold gap 23 is maintained by the perimeter seal frame 16 or some other element acting as a limit stop on the travel of the back mold 11 relative to the front mold 5. The gap 23 has such a dimension as necessary for accommodating the cover sheet 20 as well as an air gap 24 between the front mold surface 5' and the back mold surface 11'. This air gap 24 is preferably sized (e.g. 4 mm) to correspond to the thickness of the substrate that will be molded in place in the subsequent step as will be described below.

In the stage shown in FIG. 2, the seal member 17 of the perimeter seal frame 16 has contacted the perimeter edge of the foam backing 22, so as to form a high pressure seal therebetween by pressing the cover sheet 20 against an edge rim of the front mold 5, and the elastic yielding device such as a spring 18 has yielded to maintain the rated sealing pressure or force. Then, a pressure medium, preferably pressurized air, is introduced through the air line 13, the air passages 12, and the air holes 14 into the air gap 24 at a significant pressure (e.g. 6 to 30 bar). Meanwhile, any remaining air trapped between the skin film 21 and the front mold surface 5' escapes passively through the vacuum holes 9 into the vacuum plenum 6. At the same time, or slightly thereafter, a slight vacuum may be applied through the vacuum port 7, so as to remove any remaining air bubbles and uniformly apply a vacuum through the vacuum holes 9 to the skin film 21.

Thereby, the pressure medium pressing uniformly against the foam backing 22 achieves the final molding of the cover sheet 20 against the front mold surface 5', in a purely pneumatic blow-molding manner, preferably without direct mechanical molding contact between the back mold surface 11' and the cover sheet 20 at this stage. The result is a very uniform and contour-adaptive molding of the cover sheet 20 against the front mold surface 5', which compensates for any tolerances or deviations or the like between the two molds. Since the foam backing 22 is not (or substantially not) air permeable, the foam backing 22 acts as a molding buffer or intermediary, and distributes the molding pressure uniformly to the skin film 21. Thereby the melted skin film is pressed and molded uniformly against the textured front mold surface 5'. Also, simultaneously at this time, or slightly thereafter, the vacuum that may be applied through the vacuum holes 9 ensures that no air pockets remain trapped between the skin film 21 and the front mold surface 5', and fixedly holds the skin film 21 in a fixed registered position relative to the front mold surface 5'. This ensures that the skin film 21 will not shift relative to the front mold surface once it has come into contact therewith. This in turn prevents the formation of distortions or "double images" of the surface texture of the front mold surface 5' into the skin film 21.

As mentioned above, the cover sheet 20 was provided into the molding apparatus with the skin film 21 substantially melted into a viscous liquid state at a temperature above its melting temperature. Accordingly, as the cover sheet 20 is pressure molded against the textured surface of the front mold surface 5', an exact reverse or inverse pattern or texture is formed in the melted skin film 21. As the melted skin film 21 contacts the front mold 5 (which has been tempered to a temperature of about 50° C. by a coolant liquid flowing in the coolant passages 10), the melted material of the skin film 21 begins to cool and then re-solidifies once it is cooled to below the melting temperature. Thereby, the resulting contour and the surface texture are "frozen" or fixedly maintained in the skin film 21. Simultaneously, the pre-heated foam backing 22 is cooled by the tempered back mold 11 so that it becomes more rigid and maintains the molded contour.

Then, the supply of pressure medium through the air line 13 is discontinued, while the application of vacuum through the vacuum port 7 and vacuum holes 9 is preferably continued so as to hold the molded cover sheet 20 in a fixed position relative to the front mold 5 while the cooling and rigidifying of the cover sheet 20 continue. The molding apparatus 1 is then opened, i.e. the is back mold tool is moved downward and/or the front mold tool is moved upward. At this stage the completed, molded and textured cover sheet 20 can be removed and later may be applied as a cover skin onto any desired substrate component in a separate procedure. Alternatively at this stage, the cover sheet 20 may remain held by vacuum against the front mold 5, while a substrate material 30 may be directly molded onto the back of the pre-molded cover sheet 20 in the same molding apparatus 1.

For this step, the substrate material 30 is introduced between the back mold 11 and the front mold 5, i.e. particularly between the back mold 11 and the foam backing 22 of the cover sheet 20. This substrate material 30 is preferably a pre-heated sheet of a composite of polyolefin fibers, such as polypropylene fibers, and natural fibers or glass fibers or polyester fibers or the like, or may be a polyurethane foam, which has been preheated by any conventionally known means and which is carried or positioned in the molding apparatus by any conventionally known means.

Figure 3:
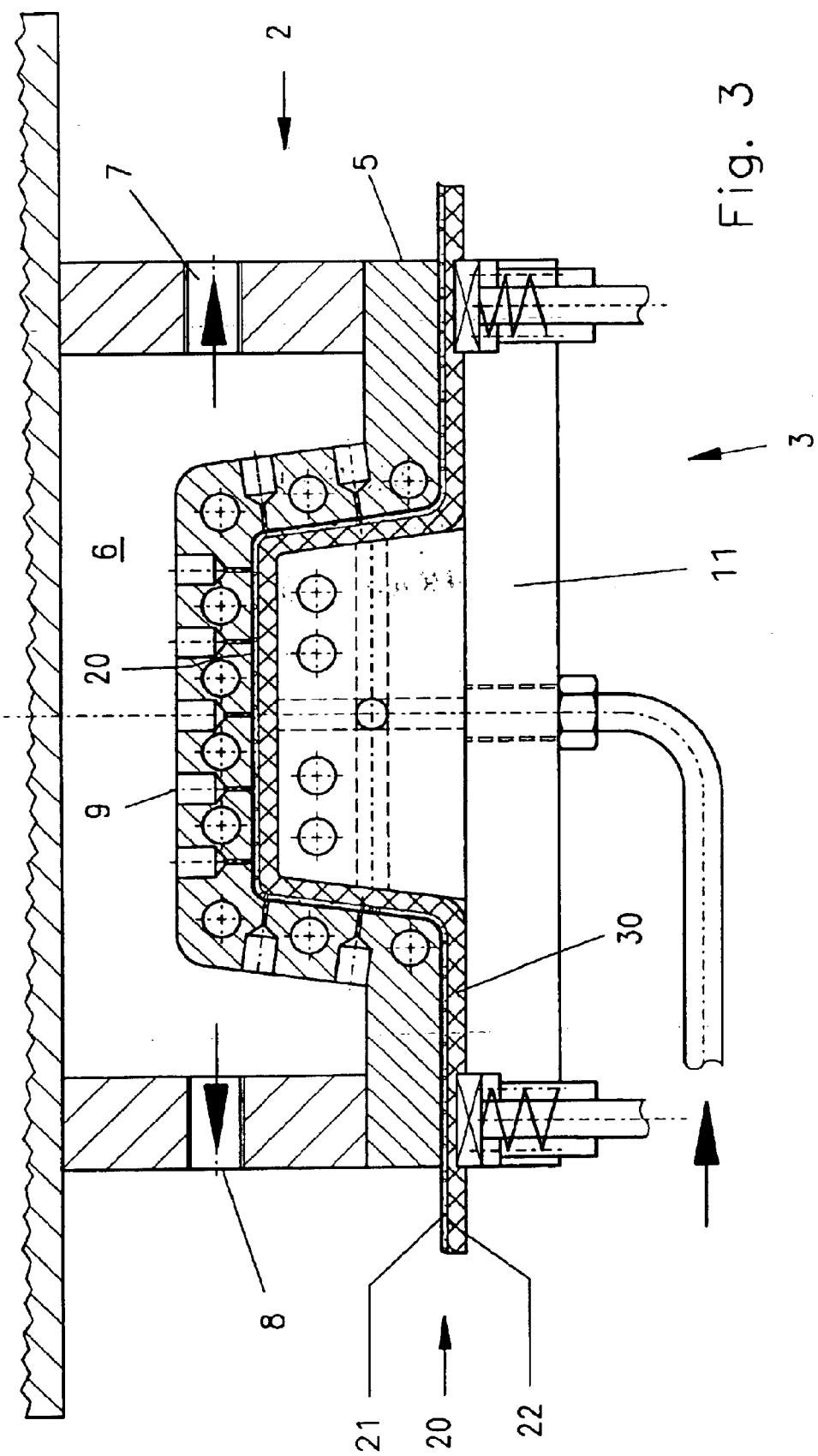
FIG. 3 is a schematic sectional view of the molding apparatus according to FIG. 2, in a subsequent step, in which a substrate is being molded and laminated onto the back surface of the molded cover sheet.

As shown in FIG. 3, the molding apparatus 1 has then again been closed, i.e. the back mold tool 3 has been driven upward and/or the front mold tool 2 has been driven downward so that the back mold 11 presses and molds the substrate 30 against the back surface of the foam backing 22 of the previously molded cover sheet 20. At this stage, the molding can be carried out entirely mechanically, i.e. without requiring the pressure medium through the air line 13, but alternatively it is beneficial to again introduce the pressure medium through the air line 13 so as to apply a uniform molding pressure to the substrate 30, which accommodates or compensates for any deviations or tolerances of the mold contours. The perimeter seal frame 16 maintains the air-tight seal around the perimeter of the molded arrangement. The pre-heated and at least partly melted polyolefin fibers of the substrate 30 undergo melt bonding with the still-warm or still-hot foam backing 22 of the cover sheet 20, so that the substrate 30 is integrally bonded onto the cover sheet 20 without requiring any additional adhesive or the like therebetween. Also, the substrate 30 has been mechanically molded and formed into the required three-dimensionally contoured configuration, while the substrate material 30 now takes up the space of the mold gap 23 that had previously been the air gap 24 in the molding stage shown in FIG. 2.

Thereby the entire molding operation or sequence to mold and apply a surface texture to the cover sheet 20, and then mold and laminate the substrate 30 onto the cover sheet 20, can be carried out with a single set of mold tooling in a single molding apparatus, in two successive molding stages, without requiring any readjusting or repositioning of the molds or other equipment, and without requiring moving the molded part to a different apparatus for any of the required processing steps.

Figure 4:
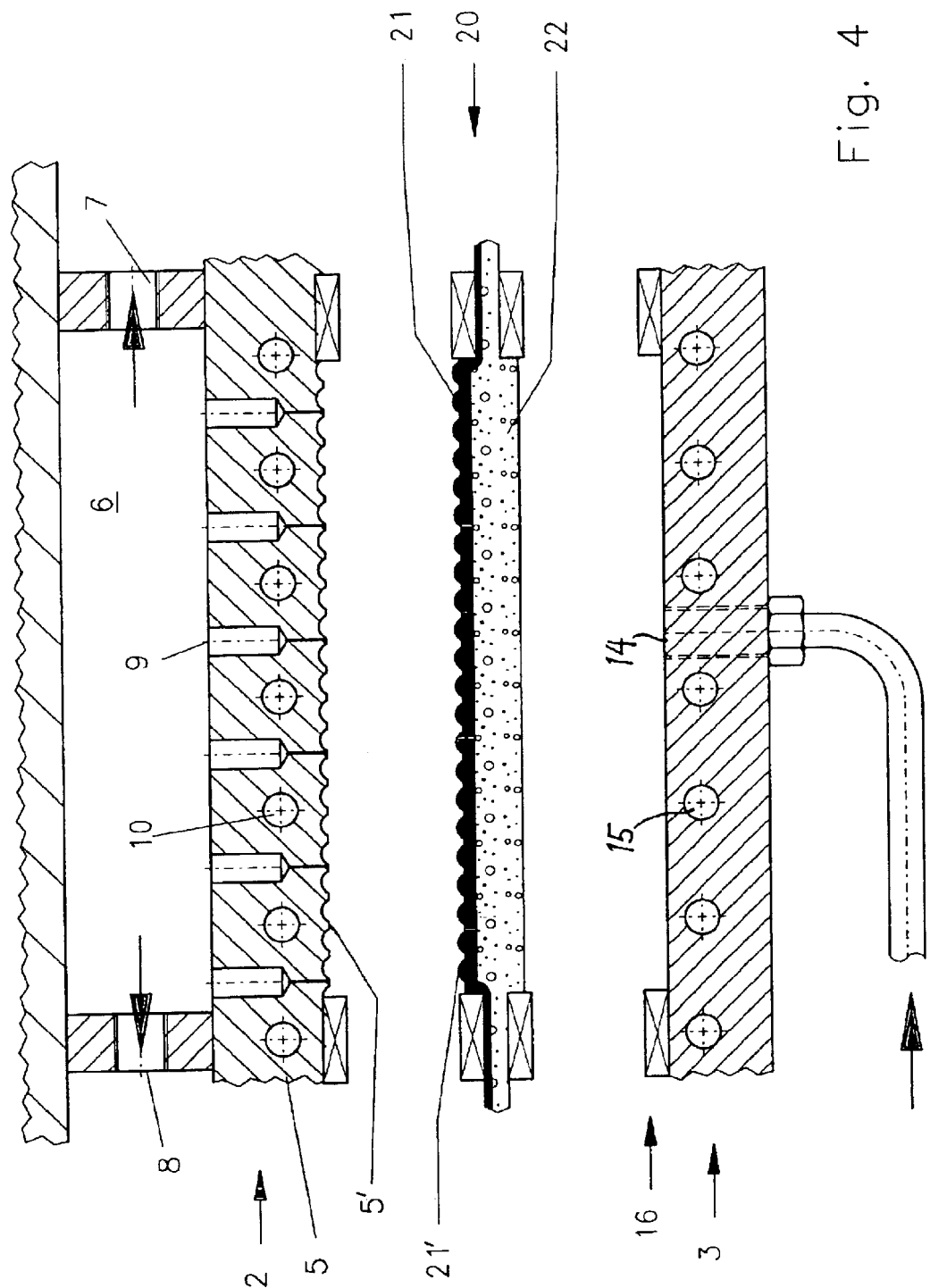
FIG. 4 is an enlarged sectional schematic detail view, in schematic form, of the cover sheet that has been molded between the front mold and the back mold.
Figure 5:
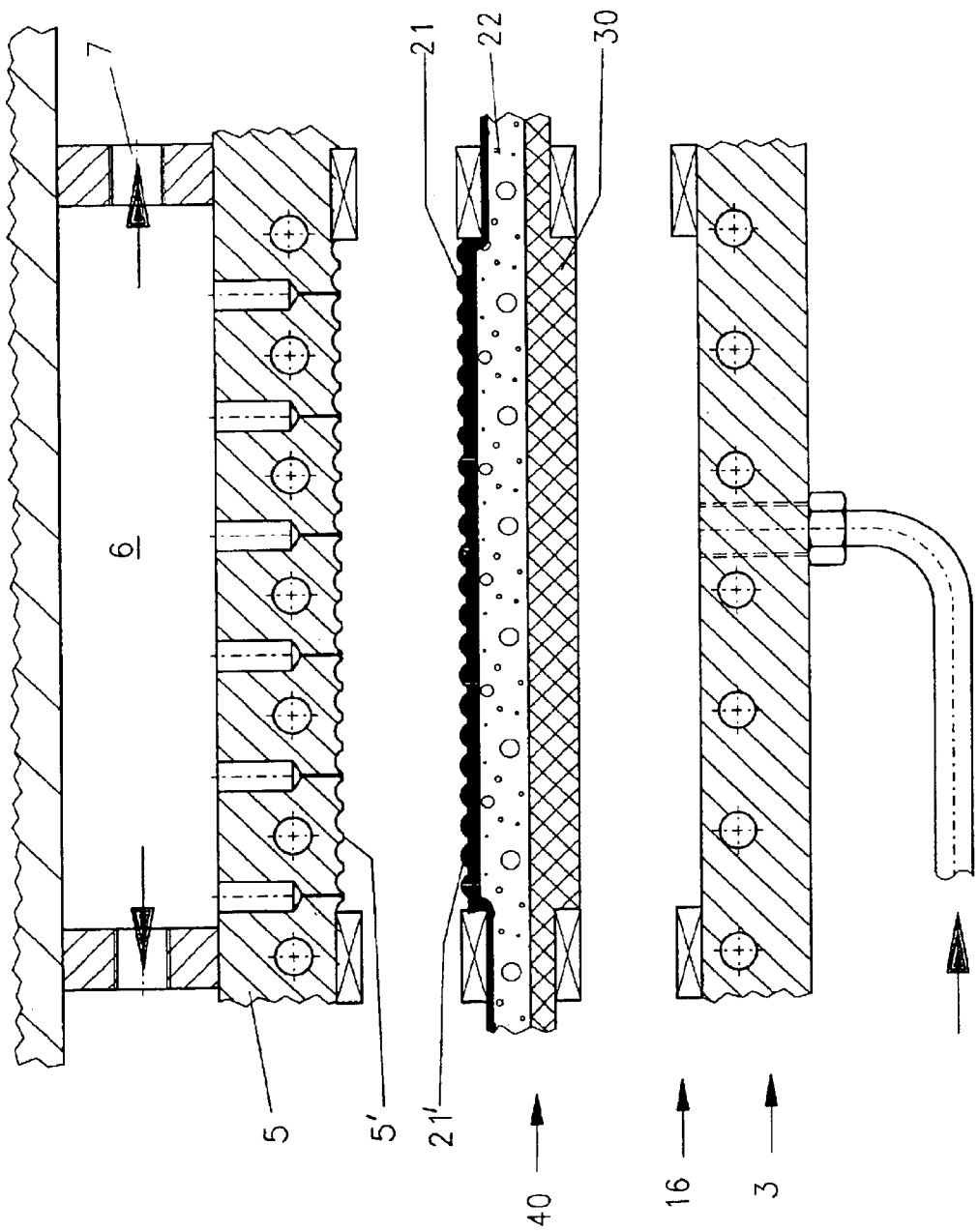
FIG. 5 is a sectional schematic detail view of the molded cover sheet similar to that of FIG. 4, but showing the subsequent stage in which a substrate has been laminated onto the back of the molded cover sheet.

For the sake of explanation, FIG. 4 schematically shows the exaggerated result of the first molding stage carried out in FIG. 2. Namely, both the surface texture of the front mold surface 5' and the resulting surface texture 21' of the skin film 21 of the cover sheet 20 are shown with exaggeration, to clearly illustrate that the resulting surface texture 21' of the skin film 21 is the exact undistorted negative or inverse of the surface texture that had been engraved or etched into the front mold surface 5' of the front mold 5. Similarly, FIG. 5 shows an exaggerated schematic detail of the result of carrying out the second molding stage of FIG. 3. The cover sheet 20 maintains its surface texture and contour, while a substrate material 30 has been molded and laminated onto the back surface thereof. It should be noted, that due to the provision of the mold gap 23 including the air gap 24, which later accommodates the substrate material 30 in the stage of FIG. 3, it is ensured that the foam backing 22 is not crushed or densified, so that the finished molded part 40 maintains a "soft touch" characteristic while also having a precisely textured and configured surface texture 21'.

As alternatives to introducing a sheet of substrate material 30 in the second molding stage shown in FIG. 3, it is alternatively possible to introduce a foaming polymer material to form the substrate 30, by spraying, casting, pouring, or injecting this material 30 into the mold air gap 24 between the cover sheet 20 and the back mold 11. In any event, the substrate material 30 is molded and formed into the required three-dimensionally contoured shape, while also being laminated and adhered onto the foam backing 22 of the cover sheet 20. In a further alternative, the pressure medium itself is a foaming polymer resin that is introduced into the mold gap in a liquid state, e.g. by injection through appropriate injection ports at the molding stage of FIG. 2. This in effect combines the stages of FIG. 2 and FIG. 3 into a single stage. As the foaming polymer resin injected into the mold gap at the stage of FIG. 2 begins to foam and expand, it generates a corresponding pressure, and thereby acts as the pressure medium that presses the cover sheet 20 against the front mold surface 5' in the molding stage of FIG. 2 as described above. Then, as the foaming polymer resin cools and hardens or cures, in contact with the tempered back mold 11, it directly forms the substrate 30 as shown in FIG. 3. Thus, such a back-foaming process allows the entire molding operation to be carried out with a single mold opening and closing cycle.

In any event, regardless of the particular manner of forming the substrate 30, the substrate 30 and the cover sheet 20 are further cooled and somewhat rigidified in the stage of FIG. 3, due to the contact with the cooler tempered front mold 5 and back mold 11. When the mold is finally opened, the finished molded part 40 as schematically illustrated in FIG. 5 is removed from the mold, after having discontinued the application of vacuum through the vacuum port 7.

Alternatively, the molded cover sheet 20 could be used by itself as an end product without the substrate lamination according to FIG. 3. In other words, the present process could be regarded as finished after the completion of FIG. 2. Then, the molded and textured cover sheet could be combined with any conventional substrate in any conventional manner, or could be used "as is" in suitable applications.

In further optional steps according to the invention, after completion of the second molding stage in FIG. 3, another cover sheet may be molded onto the opposite surface of the substrate 30, whereby this additional cover sheet may also be provided with a textured surface of its skin film. To achieve this, the cover sheet would be preheated in the same manner as the cover sheet 20, so that the skin film thereof is above its melting temperature while the foam backing thereof is below its melting temperature. Then, the preheated additional cover sheet is introduced into the open mold between the substrate and the back mold 11, of which the back mold surface 11' has also been provided with a textured surface. Then, the mold is closed, to a sufficiently larger mold gap opening to accommodate the additional cover sheet. Pressurized air is applied to the vacuum holes 9, while vacuum is applied to the air holes 11, so as to substantially carry out the initial molding and surface-texturing process of FIG. 2, but with the functions of the front mold and second mold reversed. This stage would not achieve a blow-molding so much as the first stage, but it would form the molded-in surface texture. In this manner, a finished molded part can be formed, which has textured surfaces of respective skin films on the two opposite surfaces thereof.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of making a molded component having a molded-in surface texture, using a molding apparatus including a front mold having a front mold surface with a front mold surface texture, and a back mold having a back mold surface opposed to said front mold, said method comprising the following steps:

a) providing a cover sheet including a skin film comprising a skin film material, and a foam backing comprising a foam backing materials;

b) heating said cover sheet so as to heat said skin film to a first temperature equal to or above a melting temperature of said skin film material, and so as to heat said foam backing to a second temperature below a melting temperature of said foam backing material;

c) arranging said cover sheet between said front mold and said back mold with said skin film facing toward said front mold and said foam backing facing toward said back mold, and then moving at least one of said front mold and said back mold relatively toward each other with said cover sheet therebetween;

d) molding said cover sheet and bringing said skin film into direct contact with said front mold surface so as to mold into said skin film a molded-in surface texture that is the inverse of said front mold surface texture;

e) after said step d), cooling said cover sheet and moving apart at least one of said front mold and said back mold relative to each other; and f) after said step e), introducing a substrate material between said foam backing and said back mold surface, and moving at least one of said front mold and said back mold relatively toward each other, so that said back mold surface presses against said substrate material and molds and bond said substrate material onto said foam backing so as to form a molded substrate from said substrate material.

2. The method according to claim 1, wherein said substrate material is a pre-heated sheet of at least one composite material selected from the group consisting of polypropylene and natural fibers, polypropylene and polyester fibers, and polypropylene and glass fibers.

3. The method according to claim 1, wherein said substrate material is a polyurethane foam.

4. The method according to claim 1, wherein said introducing of said substrate material comprises one of injecting, spraying, pouring and casting said substrate material in a viscous liquid state.

5. The method according to claim 1, wherein said step d) comprises introducing a pressurized pressure medium into a gap with a defined gap spacing size between said foam backing and said back mold surface, and wherein said introducing of said substrate material comprises introducing said substrate material into said gap with said defined gap spacing size between said foam backing and said back mold surface that had been occupied by said pressure medium in said step d).

6. The method according to claim 1, wherein said molded-in surface texture comprises one of an artificial leather grain, an artificial wood grain, a raised text, an indented text, a raised logo, an indented logo, a geometric repetitive pattern of protrusions, and a geometric repetitive pattern of indentations.

7. A method of making a molded component using a molding apparatus including a front mold having a front mold surface with a front mold surface texture, and a back mold having a back mold surface opposed to said front mold, said method comprising the following steps:

a) providing a cover sheet including a skin film comprising a skin film material, and a foam backing comprising a foam backing material;

b) heating said cover sheet so as to heat said skin film to a first temperature equal to or above a melting temperature of said skin film material, and so as to heat said foam backing to a second temperature below a melting temperature of said foam backing material;

c) arranging said cover sheet between said front mold and said back mold with said skin film facing toward said front mold and said foam backing facing toward said back mold, and then moving at least one of said front mold and said back mold relatively toward each other with said cover sheet therebetween, so as to mechanically pre-mold said cover sheet toward said front mold surface;

d) forming a pressure-tight seal between said foam backing and said back mold surface, and introducing pressurized air at a pressure in a range from 1 bar to 30 bar into a gap between said foam backing and said back mold surface so as to blow-mold said cover sheet and press said skin film against said front mold surface and thereby mold into said skin film a molded-in surface texture that is an inverse of said front mold surface texture;

e) during said step d), venting air from between said skin film and said front mold surface;

f) applying a vacuum between said skin film and said front mold surface;

g) moving apart at least one of said front mold and said back mold relative to each other; and h) introducing a substrate material between said foam backing and said back mold surface, and then moving at least one of said front mold and said back mold relatively toward each other, so that said back mold surface presses against said substrate material and molds and bonds said substrate material onto said foam backing so as to form a molded substrate from said substrate material.

8. A method of making a molded component having a molded-in surface texture, using a molding apparatus including a front mold having a front mold surface with a front mold surface texture, and a back mold having a back mold surface opposed to said front mold, said method comprising the following steps:

a) providing a cover sheet including a skin film portion comprising a skin film material, and a backing portion comprising a backing material;

b) differentially heating said cover sheet so as to melt said skin film portion into a melted viscous liquid state while maintaining said backing portion in an elastic solid state;

c) arranging said cover sheet between said front mold and said back mold with said skin film portion facing toward said front mold and said backing portion facing toward said back mold, and then moving at least one of said front mold and said back mold relatively toward each other with said cover sheet therebetween so that said back mold surface mechanically pre-molds said cover sheet toward said front mold surface;

d) forming a pressure-tight seal between said cover sheet and said back mold around a perimeter;

e) after said steps c) and d), introducing a pressurized gas into a gap between said back mold surface and said backing portion of said cover sheet to press said cover sheet toward said front mold surface and thereby further mold said cover sheet and bring said skin film portion into direct contact with said front mold surface while said skin film portion is at least initially at least partially still in said melted viscous liquid state so as to mold into said skin film portion a molded-in surface texture that is the inverse of said front mold surface texture; and f) after said step e), cooling said cover sheet and moving apart at least one of said front mold and said back mold relative to each other.

9. The method according to claim 8, further comprising removing air from between said skin film portion and said front mold surface during said step e).

10. The method according to claim 9, wherein said removing of air comprises passive venting of air as said pressurized gas presses said cover sheet toward said front mold surface.

11. The method according to claim 10, further comprising, after said passive venting of air, and after said molded-in surface texture has been molded into said skin film portion and said skin film portion has at learnt partly cooled and at least partly solidified, a further step of applying a vacuum between said front mold surface and said skin film portion of said cover sheet.

12. The method according to claim 8, further comprising applying a vacuum between said front mold surface and said skin film portion after said step e).

13. The method according to claim 12, wherein said vacuum has a degree of gage vacuum of 0.05 to 0.3 bar below atmospheric pressure.

14. The method according to claim 12, wherein said vacuum is applied only after said molded-in surface texture has been molded into said skin film portion and said skin film portion has at least partly cooled and at least partly solidified.

15. The method according to claim 8, wherein said pressurized gas is introduced into said gap and maintained at a gage pressure in a range from 1 to 30 bar.

16. The method according to claim 15, wherein said gage pressure is in a range from 5 to 20 bar.

17. The method according to claim 8, wherein said pressurized gas is compressed air.

18. The method according to claim 8, wherein said step b) is carried out to heat said skin film portion to a first temperature in the range from 40° C. to 70°C. higher than a second temperature to which said backing portion is heated.

19. The method according to claim 8, wherein said step b) is carried out to heat said skin film portion to a first temperature in the range from 190° C. to 210° C. and to heat said backing portion to a second temperature in the range from 130° C. to 150° C.

20. The method according to claim 8, wherein said cover sheet is oriented with said skin film portion facing upwardly and said backing portion facing downwardly throughout all of said steps.

21. The method according to claim 8, wherein said step b) comprises contacting said backing portion with a tempered plate and directing heat radiation from an infrared heater at said skin film portion.

22. The method according to claim 8, further comprising tempering said front mold and said back mold so as to maintain a temperature of said front mold surface and said back mold surface in the range from 50° C. to 60° C.

23. The method according to claim 8, wherein said skin film material and said backing material both consist of the same polymeric composition.

24. The method according to claim 8, wherein said skin film material and said backing material respectively consist of different polymeric compositions.

25. The method according to claim 8, wherein said backing material is a polymeric foam backing material, and said backing portion is a foam backing.

26. The method according to claim 25, wherein said foam backing material is a substantially closed-cell foam that is not air permeable through a thickness thereof, and said skin film material is a thermoplastic polyolefin.

27. The method according to claim 26, wherein said foam backing material comprises a different polymer material than said thermoplastic polyolefin.

28. The method according to claim 26, wherein said foam backing material also comprises said thermoplastic polyolefin.

29. The method according to claim 8, wherein said backing material comprises a polypropylene foam and said skin film material comprises a polypropylene film.

30. The method according to claim 8, further comprising, after said step f), introducing a substrate material between said cover sheet and said back mold surface, and moving at least one of said front mold and said back mold relatively toward each other, so that said back mold surface presses against said substrate material and molds and bonds said substrate material onto said backing portion of said cover sheet so as to form a molded substrate from said substrate material.

31. The method according to claim 30, wherein said introducing of said substrate material comprises introducing said substrate material into said gap between said backing portion of said cover sheet and said back mold surface that had been occupied by said pressurized gas in said step e).

32. The method according to claim 8, wherein said molded-in surface texture comprises one of an artificial leather grain, an artificial wood grain, a raised text, an indented text, a raised logo, an indented logo, a geometric repetitive pattern of protrusions, and a geometric repetitive pattern of indentations.

33. The method according to claim 8, wherein said gap measures no more than 5 mm between said back mold surface and said backing portion of said cover sheet.

* * * * *

UNITED STATES PATENT AND TRADEMARK OFFICE
CERTIFICATE OF CORRECTION

PATENT NO. : 6,749,794 B2
DATED : June 15, 2004
INVENTOR(S) : Spengler

It is certified that error appears in the above-identified patent and that said Letters Patent is hereby corrected as shown below:

<u>Title page,</u>
Item [56], References Cited, FOREIGN PATENT DOCUMENTS, replace "WO WO01/4199901 6/2001" by -- WO WO01/41999 6/2001 --;

<u>Column 11,</u>
Line 30, after "Thereby", insert -- , --;

<u>Column 15,</u>
Line 14, before "partly", replace "learnt" by -- least --.

Signed and Sealed this

Seventh Day of December, 2004

JON W. DUDAS
*Director of the United States Patent and Trademark Office*